(12) United States Patent
Ohki

(10) Patent No.: US 7,975,738 B2
(45) Date of Patent: Jul. 12, 2011

(54) PNEUMATIC TIRE WITH TREAD HAVING LATERAL GROOVES

(75) Inventor: Yukihiko Ohki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 192 days.

(21) Appl. No.: 12/446,180

(22) PCT Filed: Oct. 30, 2007

(86) PCT No.: PCT/JP2007/071124
§ 371 (c)(1),
(2), (4) Date: Apr. 17, 2009

(87) PCT Pub. No.: WO2008/062640
PCT Pub. Date: May 29, 2008

(65) Prior Publication Data
US 2011/0048598 A1    Mar. 3, 2011

(30) Foreign Application Priority Data

Nov. 24, 2006 (JP) .................. 2006-317217

(51) Int. Cl.
*B60C 11/03* (2006.01)
*B60C 11/13* (2006.01)
(52) U.S. Cl. ............ 152/209.3; 152/209.22; 152/209.24
(58) Field of Classification Search ................ 152/209.2, 152/209.3, 209.18, 209.22, 209.24
See application file for complete search history.

(56) References Cited

U.S. PATENT DOCUMENTS
2002/0153077 A1    10/2002    Hanya

FOREIGN PATENT DOCUMENTS

| EP | 591002 | * | 4/1994 |
|---|---|---|---|
| JP | 62-268707 | * | 11/1987 |
| JP | A 2-127103 | | 5/1990 |
| JP | 11-5411 | | 1/1999 |
| JP | 2905256 | * | 6/1999 |
| JP | 11-291714 | * | 10/1999 |
| JP | A 2000-168313 | | 6/2000 |
| JP | A 2000-198321 | | 7/2000 |
| JP | 2002-012006 | * | 1/2002 |
| JP | A 2002-12006 | | 1/2002 |
| JP | A 2004-210133 | | 7/2004 |
| JP | B2 3618767 | | 2/2005 |
| JP | A 2007-106295 | | 4/2007 |

OTHER PUBLICATIONS

Machine translation for Japan 2905256 (no date).*
Machine translation for Japan 11-291714 (no date).*
Machine translation for Japan 2002-012006 (no date).*

* cited by examiner

*Primary Examiner* — Steven D Maki
(74) *Attorney, Agent, or Firm* — Greer, Burns & Crain, Ltd.

(57) ABSTRACT

Provided is a pneumatic tire which employs pitch variation for suppressing pattern noise and has uniformity further improved. Pitches 3a, 3b and 3c with different pitch lengths are formed so that a pitch with a larger pitch length is set to have a smaller groove area ratio, and to have a larger groove wall angle α on the obtuse angle side that is formed by a groove wall of a lateral groove 2 and the direction tangential to the thread surface.

5 Claims, 2 Drawing Sheets

PNEUMATIC TIRE WITH TREAD HAVING LATERAL GROOVES

This application is a U.S. National Phase under 35 U.S.C. §371 of International Application No. PCT/JP2007/071124, filed Oct. 30, 2007.

TECHNICAL FIELD

The present invention relates to a pneumatic tire. More specifically, the present invention relates to a pneumatic tire which employs pitch variation for checking pattern noise and has uniformity improved by restraining its rigidity from being unbalanced in its circumferential direction.

BACKGROUND ART

In general, a pneumatic tire is provided with blocks arranged on its tread surface in the circumferential direction at pitches with different pitch lengths in order to reduce various noises produced by patterns of the tire. The blocks disperse pitch noise in such a wide frequency that the noise performance of the tire is improved. However, when the blocks are arranged in the tire circumferential direction at different pitches as described above, there occurs a difference in rigidity between a block on a pitch with a large pitch length and a block on a pitch with a small pitch length, which produces a problem that the difference in rigidity causes vibration in the tire.

To be more precise, for a tire in which blocks are arranged in the tire circumferential direction at pitches having different pitch lengths, the pitches are usually set to have the same groove area ratio per pitch. Therefore, the larger the length of a pitch is, the larger the width of a lateral groove is. Accordingly, as shown in FIG. 5, when a tire is manufactured, a mold M largely pushes a tread rubber G downwardly below the grooves on the pitches with a large pitch length. Thus, the larger the length of a pitch is, the larger the gauge thickness below the groove is. This is the cause for making a pitch length difference vary the rigidity between blocks.

To eliminate the above problem, it has been proposed that the varying of the gauge thickness of the rubber under the grooves due to the difference between pitch lengths is suppressed in a way that a lateral groove on a pitch with a larger pitch length is set to have a larger groove wall angle which is formed by the groove wall and a direction normal to the tread surface (e.g., refer to Patent Document 1). Further, it has been proposed that the varying of the gauge thickness of the rubber under the groove due to the difference between pitch lengths is suppressed by setting a pitch with a larger pitch length to have a smaller groove area ratio (e.g., refer to Patent Document 2). According to either of these proposals, however, the tread pattern rigidity is uniformed over the entire circumference of the tire only to a limited extent.

[Patent Document 1] Japanese Patent No. 3618767
[Patent Document 2] Japanese patent application Kokai publication No. 2004-210133

DISCLOSURE OF THE INVENTION

Problem to be Solved by the Invention

To solve the above mentioned problem, an object of this invention is to provide a pneumatic tire which employs pitch variation for suppressing pattern noise, and has uniformity further improved in a way that its pattern rigidity is uniformed in the tire circumferential direction. Another object thereof is to provide such a pneumatic tire having resistance to uneven wear further improved.

Means for Solving the Problem

To achieve the above-described object, a pneumatic tire of this invention is that the pneumatic tire has a tread surface on which block rows are formed, the block rows being constituted of blocks partitioned by vertical grooves extending in the tire circumferential direction and lateral grooves intersecting the vertical grooves and extending in the tire width direction, and on which the blocks are cyclically arranged at two or more different types of pitches in the tire circumferential direction, in which, on the tread surface, a pitch having a larger pitch length is set to have a smaller groove area ratio per pitch, and to have a larger groove wall angle $\alpha$ on the obtuse angle side that is formed by a groove wall of a lateral groove and a direction tangential to the tread surface.

Further, it is preferable to configure the above-described configuration as described in (1) to (4) below.

(1) Among the two or more different types of pitches in the tire circumferential direction, a pitch having the largest length and a pitch having the smallest length are set to have the groove area ratios with a difference of 5% or less.

(2) The groove wall angle $\alpha$ is set to 90 degrees to 140 degrees, and a ratio $\alpha_{max}/\alpha_{min}$ is set to 1.01 to 1.22 which is a ratio between $\alpha_{max}$ and $\alpha_{min}$ that denote the groove wall angle of the pitch having the largest length and the groove wall angle of the pitch having the smallest length, respectively, among the two or more different types of pitches in the tire circumferential direction.

(3) Each of lateral grooves partitioning a block row on either shoulder of the tread surface is formed with a depth that becomes smaller toward the outer side of the tire, a protruding portion is formed on the groove bottom of the lateral groove at a tire equator line side, a length of the protruding portion in the longitudinal direction of the groove is set to be from 5% to 50% of a length of the lateral groove, and a height of the protruding portion is set to be from 5% to 85% of a maximum depth of the lateral groove. In this case, in each of the lateral grooves partitioning the block row on either shoulder, a portion with a smaller depth is formed to have a larger groove wall angle $\alpha$ on an obtuse angle side that is formed by the groove wall and the direction tangential to the tread surface. Further, edges of the protruding portion are preferably formed in a curved surface (4) The ratio of the groove area to the tread surface is set to 20% to 50%.

Effect of the Invention

In accordance with this invention, for a pneumatic tire, on the tread surface on which blocks are arranged in the tire circumferential direction at two or more different types of pitches, the groove area ratio per pitch of the tread surface is set small for a pitch having a large length, and the groove wall angle $\alpha$ of the lateral groove is set large for a pitch having a large length, so that the gauge thickness of a rubber below the groove on each pitch is uniformed, thus allowing the gauge thickness to be substantially uniform on the entire tire circumference. Therefore, the difference in the rigidity of blocks due to the difference in pitch lengths is eliminated, and the pattern rigidity in the tire circumferential direction is uniformed, so that uniformity can further be improved.

Further, a protruding portion having a predetermined length and height is formed on the bottom of the lateral groove at the tire equator line side on the block row on the sides of both shoulders, so that blocks on each pitch on a tire in a drive mode are prevented from falling in the tire circumferential direction, thus further improving the resistance to uneven wear.

DESCRIPTION OF SYMBOLS

1 Vertical grooves
2 Lateral grooves
3a, 3b, 3c Pitches
4, 5 Block rows
6 Ribs
7 Protruding portions
P1, P2, P3 Pitch lengths
α, α1, α2, α3 Groove wall angles

BEST MODES FOR CARRYING OUT THE INVENTION

A configuration of this invention is described in detail below with reference to the accompanying drawings.

Figure 1:
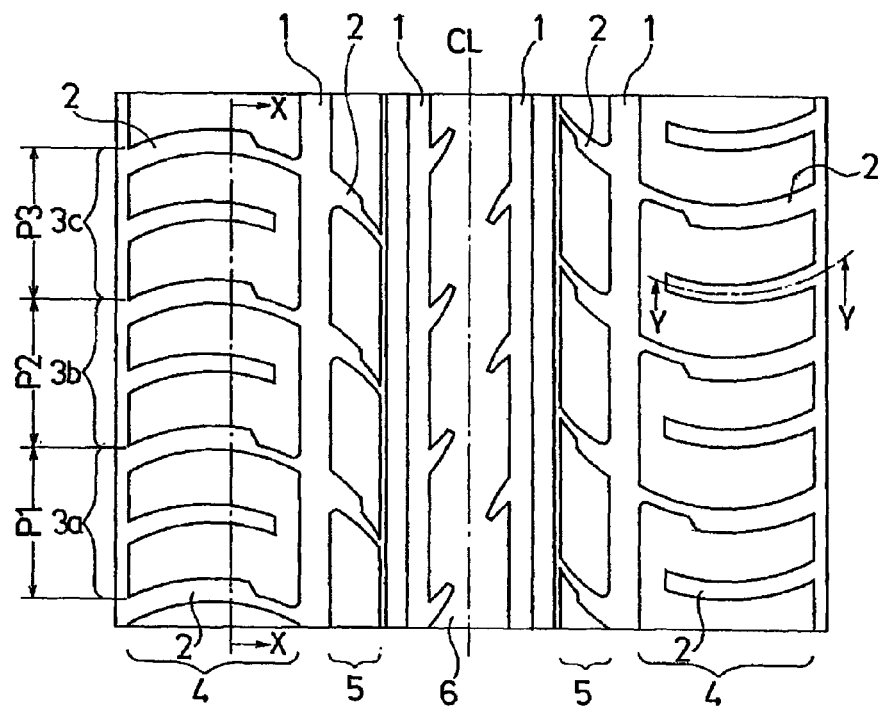
FIG. 1 is a partial plan view of a tread surface of a pneumatic tire of an embodiment of this embodiment.
Figure 2:
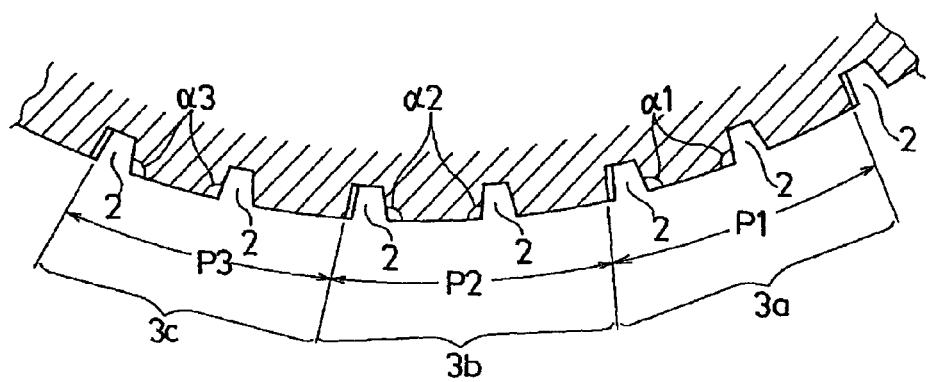
FIG. 2 is a sectional view taken along the X-X line of FIG. 1.
Figure 3:
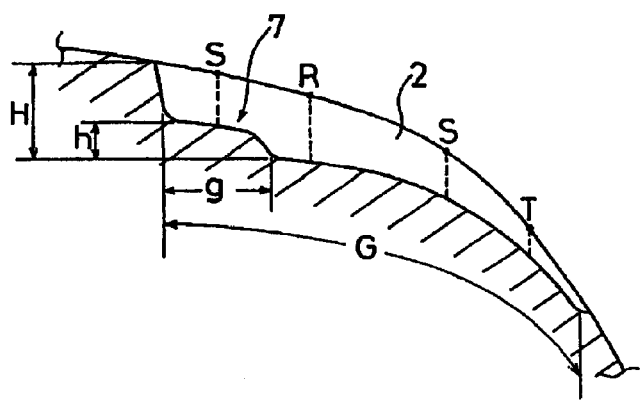
FIG. 3 is a sectional view taken along the Y-Y line of FIG. 1.

FIG. 1 is a partial plan view showing a tread surface of a pneumatic tire of an embodiment of this embodiment; FIG. 2 is a sectional view taken along the X-X line of FIG. 1; and FIG. 3 is a sectional view taken along the Y-Y line of FIG. 1.

In FIG. 1, on the tread surface of the pneumatic tire, block rows 4, 5, 5, 4 are formed, and blocks are cyclically arranged at pitches having at least two or more types of pitch lengths (three types of pitch lengths in the drawing) in the tire circumferential direction or, herein, at pitches 3a, 3b, and 3c having pitch lengths P1, P2, and P3 (P1>P2>P3). The block rows 4, 5, 5, 4 are constituted of blocks which are partitioned by vertical grooves 1 extending in the tire circumferential direction and lateral grooves being perpendicular to the vertical grooves 1 and extending in the tire width direction. Incidentally, reference numeral 6 in FIG. 1 denotes a rib.

Further, in this invention, as to the pitches 3a, 3b, 3c on the tread surface, a pitch having a larger pitch length is set to have a smaller groove area ratio per total area, and the pitch having larger length is set to have a larger groove wall angle (α1, α2, α3 in FIG. 2) on the obtuse angle side that is formed by the groove wall of the lateral groove 2 and a tangential direction of the tread surface (α1>α2>α3).

As described above, the groove area ratio is set smaller on a pitch having a larger length, and each of the groove wall angles α1, α2, α3 of the lateral groove 2 is set larger on a pitch having a larger length, so that the gauge thickness of a rubber below the grooves on the pitches 3a, 3b, 3c is uniformed, thus allowing the gauge thickness to be substantially uniform on the entire tire circumference. Therefore, the difference in the rigidity between blocks due to the pitch length difference is eliminated, and the pattern rigidity in the tire circumferential direction is uniformed, so that uniformity can further be improved.

The pitch lengths P1, P2, and P3 of this invention denote unit lengths, different from each other, at which tread patterns on the tire circumference are disposed in a repetitive manner in the tire circumferential direction. As shown in FIG. 1, the pitch lengths P1, P2, and P3 on respective pitches are each defined by the interval in the tire circumferential direction between the lateral grooves 2, 2 partitioning the unit lengths.

For the pneumatic tire of this invention, the difference between the groove area ratio on a longest pitch 3a having the largest pitch length and the groove area ratio on a shortest pitch 3c having the smallest pitch length is set to within 5% or less, or preferably set to 0.05% to 3%. When the above difference exceeds 5%, the difference in the block rigidity on the longest pitch 3a and the shortest pitch 3c becomes large, so that it becomes difficult to uniform the pattern rigidity.

Further, when setting the groove wall angles α1, α2, α3 of the lateral groove 2 to 90 degrees to 140 degrees, the ratio αmax/αmin between the groove wall angle αmax on the longest pitch indicating that the pitch length is largest (in the drawing, the groove wall angle α1 on the longest pitch 3a) and the groove wall angle αmin on the shortest pitch indicating that the pitch length is smallest (in the drawing, the groove wall angle α3 on the shortest pitch 3c) is set to 1.01 to 1.22, or preferably set to 1.02 to 1.10. When αmax/αmin is out of the above range, the difference in the block rigidity becomes large, so that it becomes difficult to uniform the pattern rigidity.

For the pneumatic tire of this invention, the groove wall angle α of the lateral groove 2 is assumed to be the same in general within the same pitch throughout the block rows 4, 5, 5, 4, but depending on a pattern configuration, the groove wall angle α of the lateral groove 2 varies in some cases for each block row (block rows 4, 5, 5, 4 in the drawing) within the same pitch. In that case, the groove wall angle α of the lateral groove 2 on each of the pitches 3a, 3b, and 3c is defined as a mean value of the groove wall angles of the block rows 4, 5, 5, 4 in the pitch.

For the pneumatic tire of this invention, the difference in the block rigidity on each pitch over the tire circumference is uniformed, and the pattern rigidity in the tire circumferential direction is uniformed, so that excellent resistance to uneven wear is produced. To further improve the resistance to uneven wear, it is more preferable that, as shown in FIG. 3, the lateral groove 2 partitioning the block row 4, 4 on either shoulder be formed with a depth H that becomes smaller toward the outer side of the tire, and that a protruding portion 7 be formed on the groove bottom at the side of the tire equator line CL. The protruding portion 7 is preferably set to have a length g in the longitudinal direction of the groove which is from 5% to 50% of a length G that is the length of the lateral groove 2, or more preferably set to have the length g which is from 10% to 30% of the length G and also have a height h which is from 5% to 85% of a maximum depth H of the lateral groove 2, or more preferably from 10% to 30% thereof. Here, the maximum depth H of the lateral groove 2 is, as shown in FIG. 3, a vertical distance between a position of the tread surface at an end of the lateral groove 2 at the side of the tire equator line CL and a position of the groove bottom of the protruding portion 7 at an outer end of the tire. Accordingly, within the range in which uniformity of the pattern rigidity on the tire circumference is not disturbed, it becomes possible to prevent blocks of the pitches 3a, 3b, 3c from falling in the tire circumferential direction when the tire is in a drive mode, and further improve the resistance to uneven wear.

Figure 4:
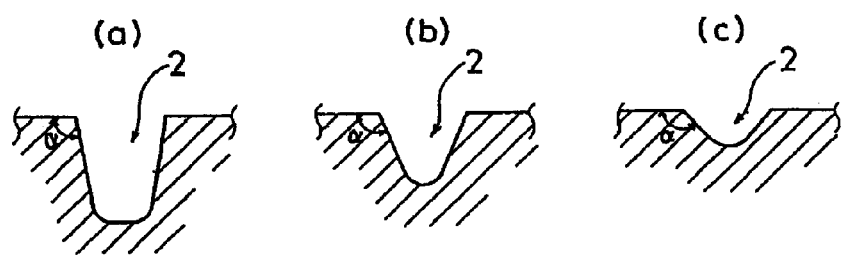
FIGS. 4a, 4b, and 4c are respectively sectional views of a lateral groove in the width direction at points R, S and T on a tread extension surface of FIG. 3
Figure 5:
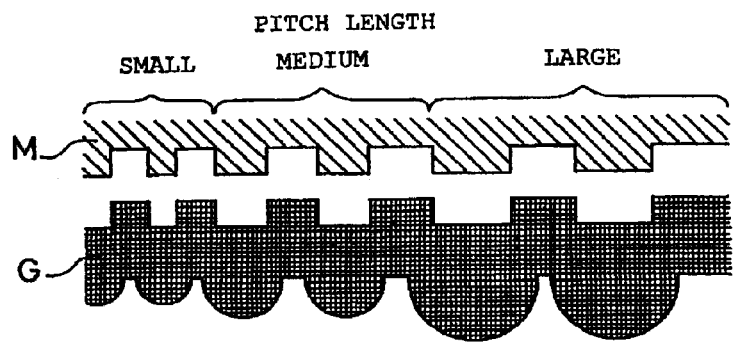
FIG. 5 is a sectional view for explaining a gauge thickness of a rubber below a groove of a conventional tire.

To further secure the improvement in the resistance to uneven wear, as shown in respective sectional views of the lateral groove 2 in the width direction at points R, S and T on a tread extension surface of FIG. 3 shown in FIGS. 4a, 4b, and 4c, the groove wall angle α of the lateral groove 2 is preferably set to become larger for the smaller depth of the lateral groove 2. FIG. 4a shows a sectional view in the width direction of the lateral groove 2 at the point R, FIG. 4b a sectional view in the width direction thereof at the point S, and FIG. 4c a sectional view in the width direction thereof at the point T. For the pneumatic tire of this invention, as shown in FIGS. 4a to 4c, the groove wall angle α on the obtuse angle side that is formed by the groove wall of the lateral groove 2 and the direction tangential to the tread surface is set to be larger on a portion of the lateral groove 2, on which the depth of the lateral groove 2 is smaller, than on a portion thereof on which the depth thereof is larger. Further, on different pitches, between the lateral grooves 2, 2, the plan configurations of which are the same, the ratio of change in the groove wall angle α is preferably set to be smaller on a pitch having a larger length. Thus, it becomes easier to make the block rigidity uniform on each pitch and make the pattern rigidity uniform in the tire circumferential direction.

In the above-described case, it is preferable that an edge of the protruding portion 7 be formed in the form of a curved surface. With this curved surface, while effectively restraining a change in the pattern rigidity among the pitches 3a, 3b, and 3c, damage on the bottom of the lateral groove 2 can effectively be restrained from occurring.

Incidentally, in FIG. 3, the case has been shown in which when the protruding portion 7 is formed on the groove bottom of the lateral groove 2 at the tire equator line CL side and on the block rows 4, 4 on the sides of both shoulders; however, the protruding portion 7 can be formed on the groove bottom of the lateral groove 2 on the block rows 5, 5 on the middle side.

In this invention, it is preferable that the ratio of groove area to the tread surface be from 20% to 50%. When the ratio of groove area to the tread surface is less than 20%, drainage performance is not sufficient, so that WET performance is deteriorated, while when the ratio of groove area to the tread surface is more than 50%, the block rigidity is not sufficient, so that maneuverability is deteriorated. It is more preferable that the ratio of groove area to a contact region of the tread surface be from 25% to 45%. Incidentally, the above contact region is a region on which the tread surface and the road surface are in contact, in a state in which the tire is inflated to an inflation pressure in accordance with JATMA (THE Japan Automobile Tyre Manufacturing Association) standard and the tire is subjected to a load that is 88% of the maximum load capacity of the tire.

The above-described embodiment has been described as the case where the tread surface is formed in an asymmetric pattern in which the ribs 6 are disposed on the middle region of the tread and two sets of block rows 5, 4 are respectively disposed on both sides thereof. However, the tread pattern of the pneumatic tire of the present invention is not limited to the above, and block patterns may be disposed on the entire tread surface. Further, the vertical grooves 1 formed on the tread surface may employ a wavy or zig-zag shape extending in the tire circumferential direction.

EXAMPLES

Twenty tires of this invention (Examples 1 to 3) and twenty comparison tires (Comparative Examples 1, 2) were fabricated in the same tire size of 275/35R20 and with the same tread pattern as that shown in FIG. 1. The groove area ratio per pitch and the groove wall angle α on the obtuse angle side that is formed by the groove wall of a lateral groove 2 and the direction tangential to the tread surface are varied as shown in Table 1. Incidentally, for each tire, pitch lengths P1, P2, and P3 are respectively set to P1 (large pitch 3a)=40 mm, P2 (medium pitch 3b)=35 mm, and P3 (small pitch 3c)=30 mm.

On the above 5 types of tires, uniformity (RFV: Radial Force Variation) is measured in accordance with JIS (Japan Industrial Standards) D4233, and the uniformity is evaluated in terms of the number of tires clearing a reference value (108N), and its result is described in Table 1 using an index which is represented by 100 for Example 1. The larger the value is, the more superior the uniformity is.

TABLE 1

|  |  | comparative example 1 | comparative example 2 | example 1 | example 2 | example 3 |
|---|---|---|---|---|---|---|
| groove area ratio per pitch (%) | large pitch 3a | 30 | 29 | 29.9 | 29.0 | 28.5 |
|  | medium pitch 3b | 30 | 30 | 30.0 | 30.0 | 30.0 |
|  | small pitch 3c | 30 | 31 | 30.1 | 31.0 | 31.5 |
| groove wall angle α of a groove on each pitch (deg.) | large pitch 3a (α1) | 97 | 95 | 97 | 97 | 97 |
|  | medium pitch 3b (α2) | 95 | 95 | 95 | 95 | 95 |
|  | small pitch 3c (α3) | 93 | 95 | 93 | 93 | 93 |
| ratio of groove wall angles αmax/αmin |  | 1.04 | 1.00 | 1.04 | 1.04 | 1.04 |
| uniformity |  | 100 | 100 | 103 | 104 | 105 |

Table 1 shows that uniformity is improved in the tires of this invention (Examples 1 to 3) compared with the comparison tires (Comparative Examples 1, 2).

What is claimed is:

1. A pneumatic tire having a tread surface on which block rows are formed, the block rows being constituted of blocks partitioned by vertical grooves extending in the tire circumferential direction and lateral grooves intersecting the vertical grooves and extending in the tire width direction, and on which the blocks are cyclically arranged at two or more different types of pitches in the tire circumferential direction, wherein, on the tread surface, a pitch having a larger pitch length is set to have a smaller groove area ratio per pitch, and to have a larger groove wall angle α on the obtuse angle side that is formed by a groove wall of a lateral groove and a direction tangential to the tread surface, each of lateral grooves partitioning a block row on either shoulder of the tread surface is formed with a depth that becomes smaller toward the outer side of the tire, a protruding portion is formed on the groove bottom of the lateral groove at a tire equator line side, a length of the protruding portion in the longitudinal direction of the groove is set to be from 5% to 50% of a length of the lateral groove, and a height of the protruding portion is set to be from 5% to 85% of a maximum depth of the lateral groove, wherein, in each of the lateral grooves partitioning the block row on either shoulder, a portion of the lateral groove with a smaller depth is formed to have a larger groove wall angle α on an obtuse angle side that is formed by the groove wall and the direction tangential to the tread surface than a portion of the lateral groove with a larger depth.

2. The pneumatic tire according to claim 1, wherein an edge of the protruding portion is formed to have a curved shape.

3. The pneumatic tire according to claim 1, wherein among the two or more different types of pitches in the tire circumferential direction, a pitch having the largest length and a pitch having the smallest length are set to have the groove area ratios with a difference of 5% or less.

4. The pneumatic tire according to claim 1, wherein
the groove wall angle α is set to 90 degrees to 140 degrees, and a ratio $\alpha max/\alpha min$ is set to 1.01 to 1.22 which is a ratio between αmax and αmin that denote the groove wall angle of the pitch having the largest length and the groove wall angle of the pitch having the smallest length, respectively, among the two or more different types of pitches in the tire circumferential direction.

5. The pneumatic tire according to claim 1, wherein the ratio of groove area to the tread surface is from 20% to 50%.

* * * * *